United States Patent
Hong et al.

(10) Patent No.: US 11,599,070 B2
(45) Date of Patent: Mar. 7, 2023

(54) ELECTRONIC DEVICE AND METHOD FOR DETERMINING TASK INCLUDING PLURAL ACTIONS

(71) Applicant: SAMSUNG ELECTRONICS CO., LTD., Suwon-si (KR)

(72) Inventors: Yeona Hong, Suwon-si (KR); Kibeom Kim, Suwon-si (KR); Youngmin Oh, Suwon-si (KR); Sangho Lee, Suwon-si (KR); Gajin Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 178 days.

(21) Appl. No.: 16/775,733

(22) Filed: Jan. 29, 2020

(65) Prior Publication Data
US 2020/0241486 A1    Jul. 30, 2020

(30) Foreign Application Priority Data
Jan. 30, 2019    (KR) .................. 10-2019-0011817

(51) Int. Cl.
*G06F 3/01*    (2006.01)
*G06Q 10/06*    (2012.01)
(Continued)

(52) U.S. Cl.
CPC ....... *G05B 13/0265* (2013.01); *B25J 11/0005* (2013.01); *G06F 3/017* (2013.01);
(Continued)

(58) Field of Classification Search
None
See application file for complete search history.

(56) References Cited

U.S. PATENT DOCUMENTS 9,721,570 B1    8/2017    Beal et al.
10,131,052 B1 *    11/2018    Ibarz Gabardos ....... B25J 9/161
(Continued)

FOREIGN PATENT DOCUMENTS

KR    10-2017-0095583    8/2017

OTHER PUBLICATIONS

International Search Report dated May 7, 2020 in counterpart International Patent Application No. PCT/KR2020/001335.
(Continued)

*Primary Examiner* — Stella Higgs
(74) *Attorney, Agent, or Firm* — Nixon & Vanderhye, P.C.

(57) ABSTRACT

Provided is an electronic device. The electronic device may include: a user interface; a processor operatively connected to the user interface; and a memory operatively connected to the processor, wherein the memory may store instructions that, when executed, cause the processor to control the electronic device to: receive an input via the user interface; determine a task including plural actions based on the input; execute a first action among the plural actions of the determined task; obtain context information related to the task while executing the first action; determine at least one first threshold associated with the first action based at least in part on the obtained context information; and determine the result of the first action based on the execution of the first action being completed based on the at least one first threshold.

16 Claims, 12 Drawing Sheets

(51) Int. Cl.
  G05B 13/02   (2006.01)
  B25J 11/00   (2006.01)
  G10L 15/22   (2006.01)
  *G06F 9/451*     (2018.01)
  *G06Q 10/0631*   (2023.01)
  *B25J 13/00*     (2006.01)

(52) U.S. Cl.
  CPC ............ G10L 15/22 (2013.01); *B25J 13/003* (2013.01); *G06F 9/451* (2018.02); *G06Q 10/06316* (2013.01); *G10L 2015/223* (2013.01)

(56) References Cited

U.S. PATENT DOCUMENTS

| | | | |
|---|---|---|---|
| 2006/0217837 A1* | 9/2006 | Koga | G05D 1/0246 700/245 |
| 2016/0077794 A1 | 3/2016 | Kim et al. | |
| 2018/0005625 A1 | 1/2018 | Han | |
| 2018/0164170 A1 | 6/2018 | Nakata et al. | |
| 2018/0253202 A1 | 9/2018 | Kong et al. | |
| 2018/0278820 A1* | 9/2018 | Piekniewski | H04N 5/2253 |
| 2018/0357414 A1 | 12/2018 | Dhondse et al. | |
| 2019/0019066 A1 | 1/2019 | Fryshman | |
| 2020/0047348 A1* | 2/2020 | Park | G06F 3/017 |

OTHER PUBLICATIONS

Extended Search Report dated Mar. 28, 2022 in EP Application No. 20747989.0.

\* cited by examiner

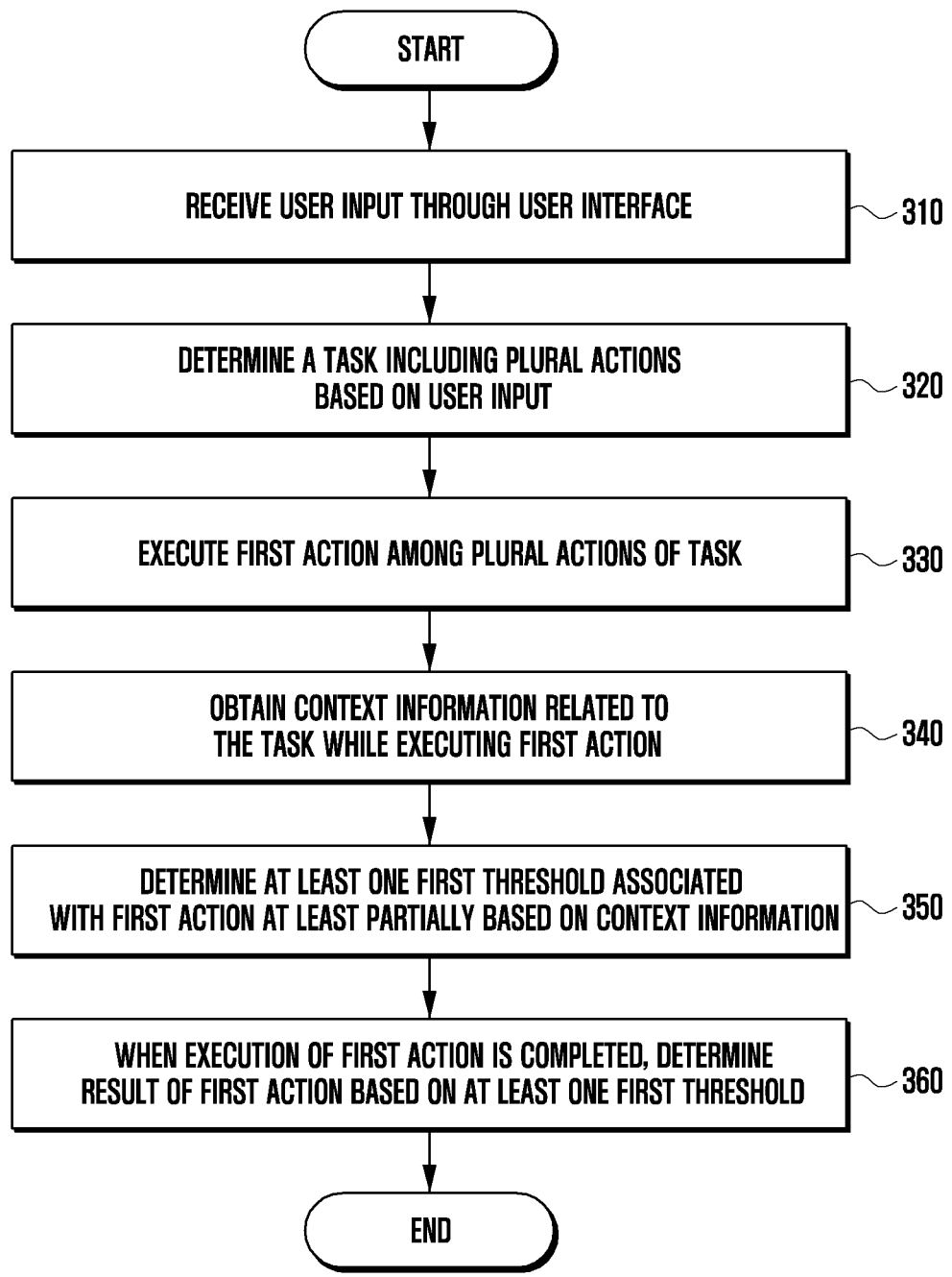

ELECTRONIC DEVICE AND METHOD FOR DETERMINING TASK INCLUDING PLURAL ACTIONS

CROSS-REFERENCE TO RELATED APPLICATION

This application is based on and claims priority under 35 U.S.C. § 119 to Korean Patent Application No. 10-2019-0011817 filed on Jan. 30, 2019, in the Korean Intellectual Property Office, the disclosure of which is incorporated by reference herein in its entirety.

BACKGROUND

Field

The disclosure relates to an electronic device and a method for determining a task including a plurality of actions.

Description of Related Art

With the development of digital technology, various types of electronic devices, such as mobile terminals, smartphones, personal computers, tablet personal computers, laptop personal computers, wearable devices, digital cameras, or Internet of Things (IoT) devices, are widely used.

Recently, electronic devices that are disposed in a space where users reside and provide various services to users have been introduced. For example, social robots that can interact with humans by using artificial intelligence (AI), IoT, or cloud computing have emerged.

These social robots may provide intelligent services that enable autonomous and active activities, and may behave according to specific social roles, observe the corresponding rules, and communicate with humans and other physical objects. Social robots can support a variety of functions such as speech and facial recognition, schedule management, photographing, or food ordering.

A mobile social robot can change its position and execute a plurality of actions to complete a task according to a command of the user. However, the social robot may differently determine whether the result of an action is successful or not owing to the influence of the surrounding environment. For example, a social robot may easily succeed in human recognition in a bright environment, but may fail in human recognition in a dark environment.

SUMMARY

Embodiments of the disclosure provide an electronic device that can obtain context information related to the task, dynamically change the threshold value for determining whether an action is successfully executed according to the context information, and determine whether the result of the action is a success or a failure.

According to various example embodiments of the disclosure, an electronic device is provided. The electronic device may include: a user interface; a processor operatively connected to the user interface; and a memory operatively connected to the processor, wherein the memory may store instructions that, when executed, cause the processor to control the electronic device to: receive an input via the user interface; determine a task including plural actions based on the input; execute a first action among the plural actions of the determined task; obtain context information related to the task while executing the first action; determine at least one first threshold associated with the first action based at least in part on the obtained context information; and determine a result of the first action based on the execution of the first action being completed based on the at least one first threshold.

According to various example embodiments of the disclosure, a method for determining a task including plural actions is provided. The method may include: receiving an input via a user interface; determining a task including plural actions based on the input; executing a first action among the plural actions of the determined task; obtaining context information related to the task while executing the first action; determining at least one first threshold associated with the first action based at least in part on the obtained context information; and determining a result of the first action based on the execution of the first action being completed based on the at least one first threshold.

In various example embodiments of the disclosure, the electronic device may adaptively determine the result of executing an action according to the environment, and may increase the success rate and accuracy of the task.

BRIEF DESCRIPTION OF THE DRAWINGS

The above and other aspects, features and advantages of certain embodiments of the disclosure will be more apparent from the following detailed description, taken in conjunction with the accompanying drawings, in which:

FIG. 3 is a flowchart illustrating an example method for determining a task including a plurality of actions according to various embodiments;

DETAILED DESCRIPTION

Figure 1:
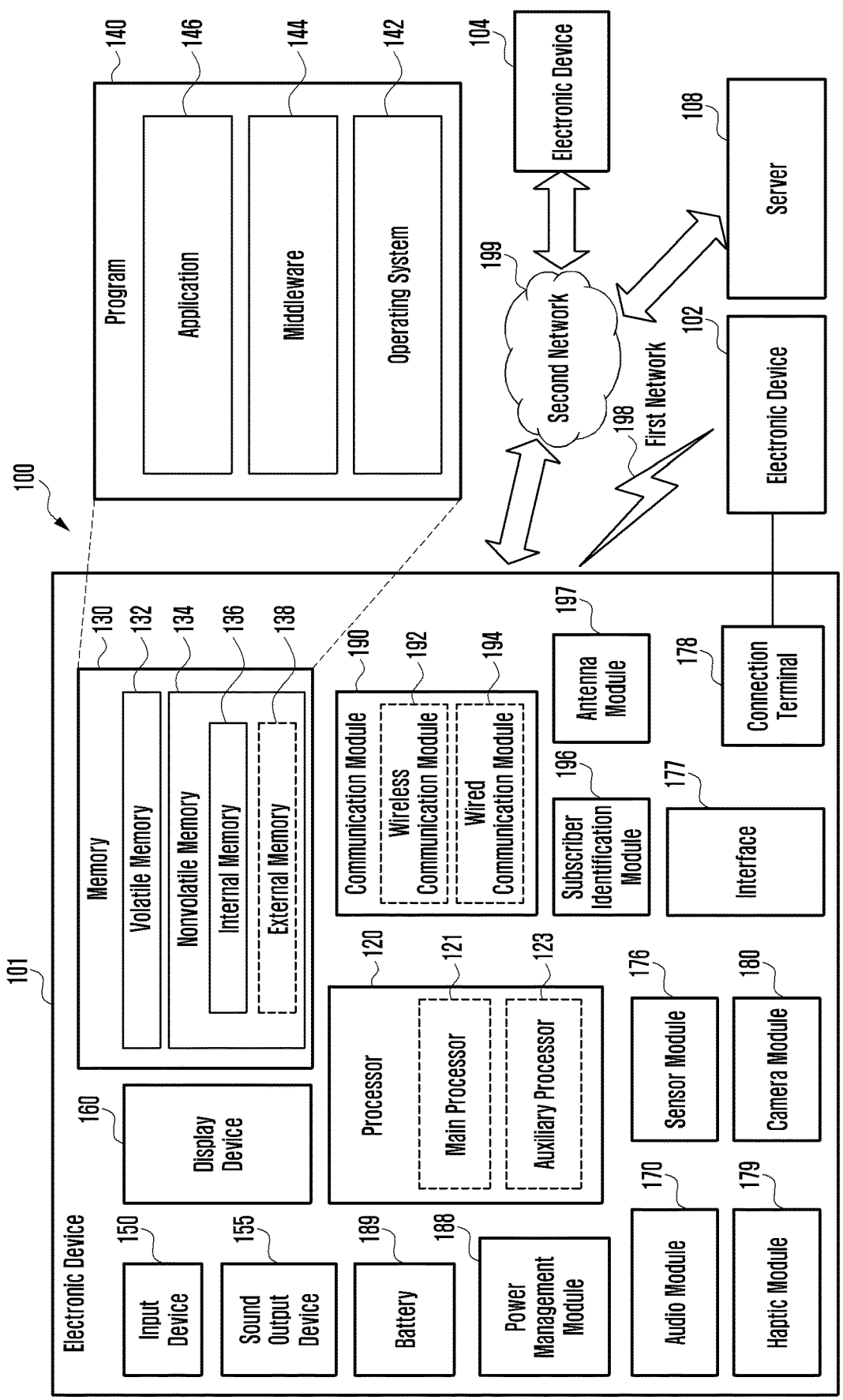
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
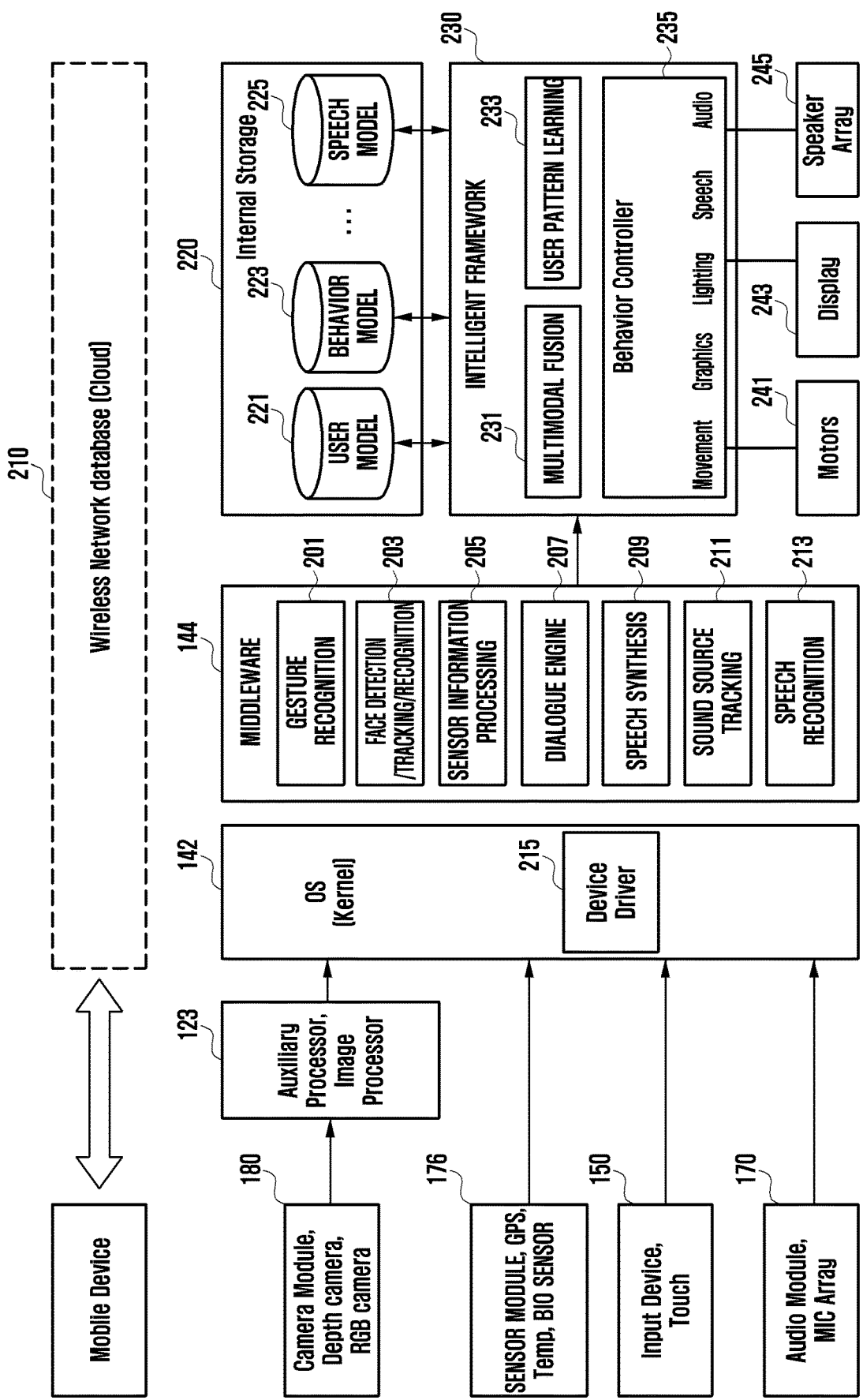
FIG. 2 is a block diagram illustrating example software according to various embodiments.

FIG. 2 is a block diagram illustrating example software according to various embodiments of the disclosure. With reference to FIG. 2, the software of the electronic device may include an operating system (OS) 142 for controlling one or more resources, a middleware 144, an intelligent framework 230, or an internal storage 220. The operating system 142 may include, for example, Android™, iOS™, Windows™, Symbian™, Tizen™, or Bada™. At least some of software programs may be, for example, preloaded into the electronic device at the time of manufacture, or may be downloaded from an external electronic device (e.g., electronic device 102 or 103, or server 108) or updated when used by the user.

The operating system 142 may control or manage (e.g., allocate or reclaim) one or more system resources (e.g., process, memory, or power) of the electronic device. The operating system 142 may additionally or alternatively include one or more device drivers 215 to drive other hardware components of the electronic apparatus 101, such as the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may detect and track the position of the face of the user by using signal processed data or perform authentication based on face recognition. The middleware 144 may perform various functions such as recognition of a user's 3D gesture, direction of arrival (DOA) estimation for an audio signal, speech recognition, and processing of various sensor data. The middleware 144 may include, for example, a gesture recognition manager 201, a face detection/tracking/recognition manager 203, a sensor information processing manager 205, a dialogue engine manager 207, a speech synthesis manager 209, a sound source tracking manager 211, or a speech recognition manager 213.

The intelligent framework 230 may include, for example, a multimodal fusion block 231, a user pattern learning block 233, or a behavior controller block 235. The multimodal fusion block 231 may, for example, collect and manage various types of information processed by the middleware 144. The user pattern learning block 233 may, for example, extract and learn meaningful information such as life patterns and preferences of the user by using the information of the multimodal fusion block 231. The behavior controller block 235 may use, for example, a motor 241, a display 243, or a speaker array 245 to represent the information to be feedbacked by the electronic device to the user in terms of motion, graphics (UI/UX), light, speech, or sound.

The internal storage 220 may include, for example, a user model DB 221, a behavior model DB 223, or a speech model DB 225. The user model DB 221 may store, for example, information learned by the intelligent framework for each user. The behavior model DB 223 may store, for example, information for behavior control of the electronic device. The information stored in each DB may be stored in, for example, a wireless network DB 210 (e.g., cloud) for sharing.

FIG. 3 is a flowchart illustrating an example method for determining a task including a plurality of actions according to various embodiments.

With reference to FIG. 3, in various embodiments, at operation 310, the processor 120 of the electronic device 101 may receive an input, e.g., a user input, through the user interface.

In various embodiments, the user interface may include at least one of a microphone or a camera. For example, the processor 120 may obtain an utterance of the user and/or an image of the user by using a microphone (e.g., input device 150) and/or a camera (e.g., camera module 180).

In an example embodiment, the processor 120 may determine a task including a plurality of actions in response to detection of a specific event.

Figure 4A:
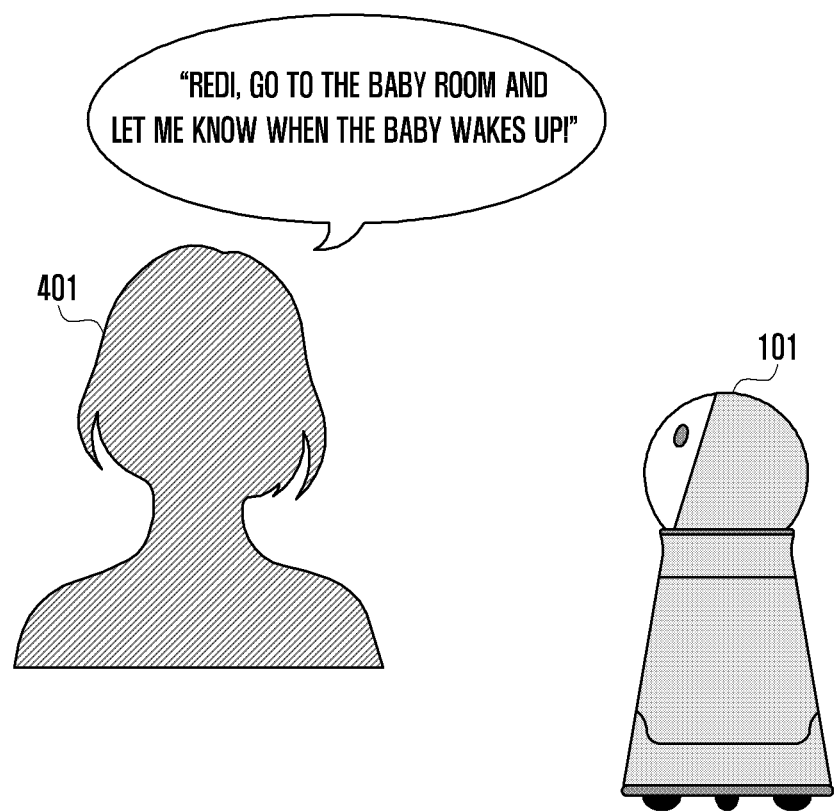
FIG. 4A is a diagram illustrating an example in which a user input includes an utterance of the user according to various embodiments.

FIG. 4A illustrates an example in which a user input includes an utterance of the user according to various embodiments.

With reference to FIG. 4A, in various embodiments, the processor 120 may recognize an utterance of the user 401 as a user input. In an example embodiment, a user's utterance may include various information. For example, if the user says "REDI, go to the baby room and let me know when the baby wakes up!", the processor 120 may recognize "REDI" in the user's utterance as an invocation to the electronic device 101. In addition, the processor 120 may recognize "go to the baby room and let me know when the baby wakes up!" and may determine a task including various actions such as "finding the baby room", "finding the baby", "monitoring the baby", and "notifying the user when the baby wakes up".

Figure 4B:
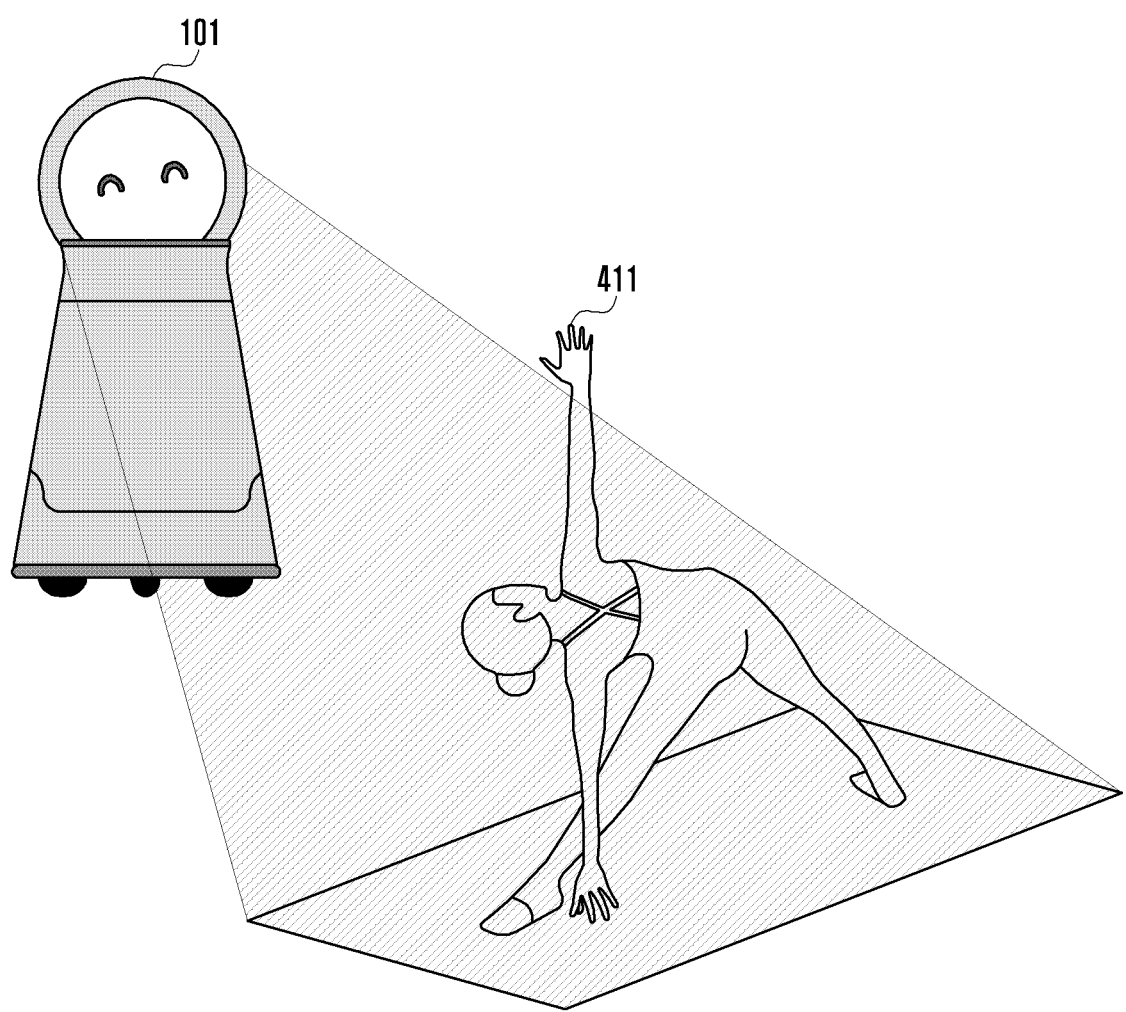
FIG. 4B is a diagram illustrating an example in which a user input includes an image of the user according to various embodiments.

FIG. 4B illustrates an example in which a user input includes an image of the user according to various embodiments.

With reference to FIG. 4B, in various embodiments, the processor 120 may recognize an image of the user 411 as a user input. In an example embodiment, the image of the user 411 may include various information. For example, the electronic device 101 may check whether the user 411 in the image makes a specific gesture or performs a specific action, and may determine whether to recognize the gesture or action as an invocation to the electronic device 101. As another example, the electronic device 101 may identify the state of the user (e.g., exercising) by using an image of the user. In a certain embodiment, the electronic device 101 may perform a specific operation (e.g., exercise coaching) based on the state of the user.

With reference back to FIG. 3, in various embodiments, at operation 320, the processor 120 of the electronic device 101 may determine a task including a plurality of actions based on the user input. At least some of the plural actions in the task may be associated with each other to form a tree structure. Each action in the tree structure may be executed sequentially or selectively according to the control of the processor 120.

In various embodiments, the processor 120 may obtain context information first before determining a task and determine a task based on the obtained context information. For example, in the case of a mobile electronic device 101, the task may be determined differently according to the location information of the electronic device 101. The processor 120 may identify location information of the electronic device 101 and determine the task at least partially based on the identified location information. For example, upon receiving a user input "REDI, go to the baby room and let me know when the baby wakes up!", the processor 120 may or may not include "finding the baby room" in the task at least partially based on the current location information of the electronic device 101. For instance, when the electronic device 101 is located in the baby room, "finding the baby room" may be omitted from the task.

Figure 5:
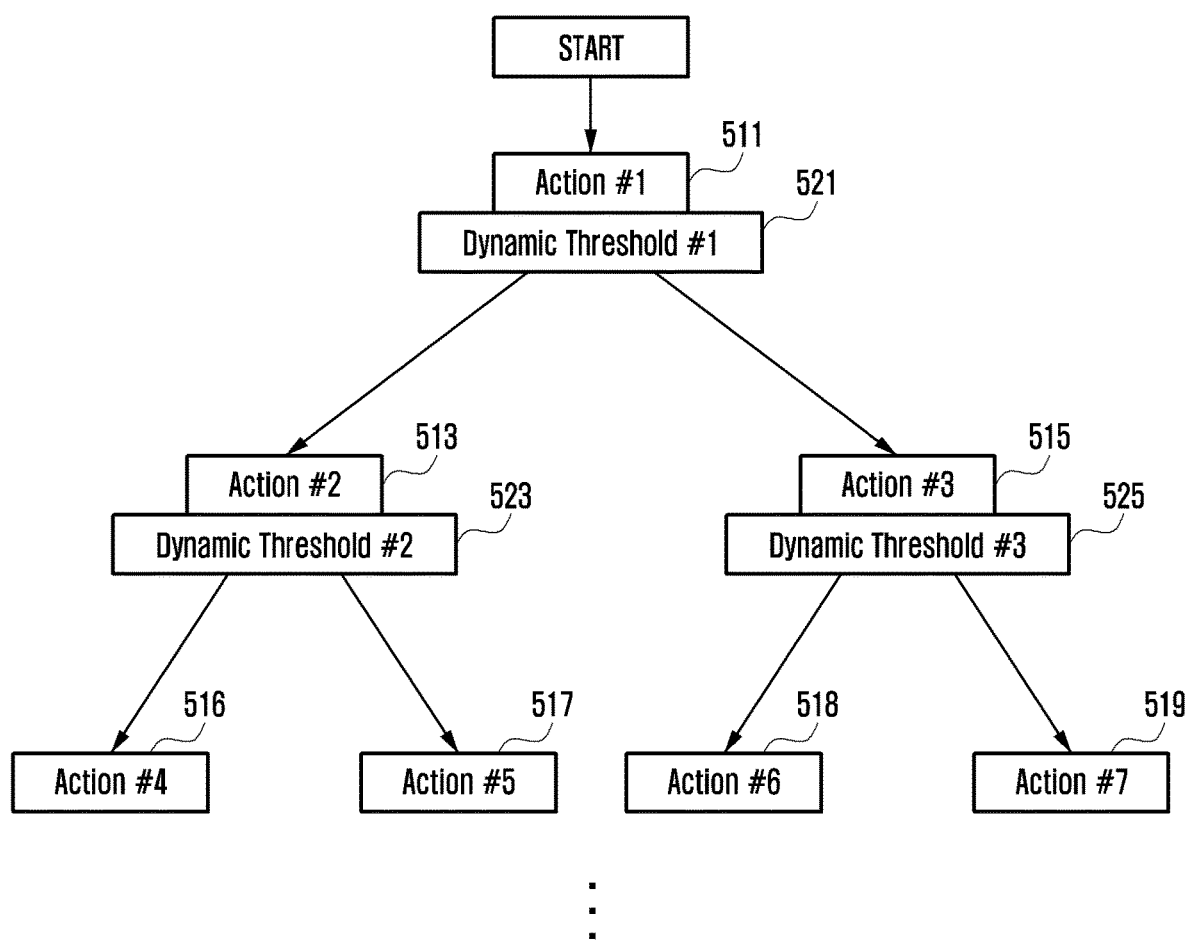
FIG. 5 is a diagram illustrating an example task according to various embodiments.

FIG. 5 is a diagram illustrating an example task according to various embodiments.

With reference to FIG. 5, the task may include a plurality of actions. At least some of the plural actions of the task may be associated with each other to form a tree structure. For example, Action #1 (511) to be executed first is associated with Action #2 (513) and Action #3 (515), Action #2 (513) may be associated with Action #4 (516) and Action #5 (517), and Action #3 (515) may be associated with Action #6 (518) and Action #7 (519).

In various embodiments, the processor 120 may determine the action to be executed next based on a threshold corresponding to the action being executed. For example, the processor 120 may calculate a score of the action that has been completed and determine the action to be executed next depending upon whether the score satisfies the corresponding threshold.

In various embodiments, the plural actions may each have a corresponding threshold. For example, Action #1 (511) may have dynamic threshold #1 (521), Action #2 (513) may have dynamic threshold #2 (523), and Action #3 (515) may have dynamic threshold #3 (525).

In an example embodiment, an action may have multiple thresholds. For example, Action #1 (511) may have two or more thresholds. In this case, Action #1 (511) may be associated with three or more actions, and the processor 120 may determine an action to be executed next based on combinations of the plural thresholds. In various embodiments, the threshold can be changed dynamically according to the context information.

With reference back to FIG. 3, in various embodiments, at operation 330, the processor 120 of the electronic device 101 may execute a first action among the plural actions of the determined task. For example, upon receiving a user input "REDI, go to the baby room and let me know when the baby wakes up!", the processor 120 may execute the action "finding the baby room" as the first action.

At operation 340, the processor 120 of the electronic device 101 may obtain context information related to the task while executing the first action.

In various embodiments, the context information may include at least one of history information stored in the memory (e.g., memory 130) or an external electronic device (e.g., electronic device 102, electronic device 104, or server 108), environmental information obtained through a sensor (e.g., sensor module 178), or user information. The environmental information may include, for example, brightness information, temperature information, humidity information, and location information around the electronic device. The user information may include, for example, information about the age, gender, height, motion, facial image, or facial expression of the user.

In various embodiments, the processor 120 may obtain context information related to the first action and/or actions associated with the first action. For example, with reference to FIG. 5, the processor 120 may obtain context information related to at least one of Action #1 (511), Action #2 (513), or Action #3 (515) while executing Action #1 (511). This context information may be used to dynamically change the threshold corresponding to each action (e.g., dynamic threshold #1 (521), dynamic threshold #2 (523), or dynamic threshold #3 (525)). For example, when the first action is "finding the baby room", the processor 120 may identify an action "finding the baby" in association with "finding the baby room", and may obtain, as context information, history information related to the baby room, and information about the current brightness of the baby room, the face of the baby, and/or the size of the baby.

In various embodiments, at operation 350, the processor 120 of the electronic device 101 may determine at least one first threshold associated with the first action at least partially based on the obtained context information.

In an example embodiment, if the first action is "finding the baby room", the time T1 required to find the baby room may be preset as a threshold (e.g., 30 seconds). The preset time T1 may be dynamically changed according to the context information obtained during the execution of the first action. For example, the processor 120 may obtain history information while executing "finding the baby room" and may check whether there is pre-stored information about the baby room in the history information. If the baby room has never been visited, the processor 120 may increase the value of the time T1 (e.g., 60 seconds). If there is some information about the baby room, the processor 120 may decrease the value of the time T1 (e.g., 20 seconds) or maintain the current value thereof (e.g., 30 seconds).

In various embodiments, at operation 360, when the execution of the first action is completed, the processor 120 of the electronic device 101 may determine the result of executing the first action based on the at least one first threshold.

For example, if the first action is "finding the baby room", the processor 120 may determine whether the first action is successfully executed on the basis of the time T1 (e.g., 60 seconds, 30 seconds, or 20 seconds) that is dynamically changed according to the context information. For example, when 40 seconds have been taken to find the baby room, "success" may be returned if the time T1 has been changed to 60 seconds, and "failure" may be returned if the time T1 has been changed to 30 or 20 seconds.

Figure 6:
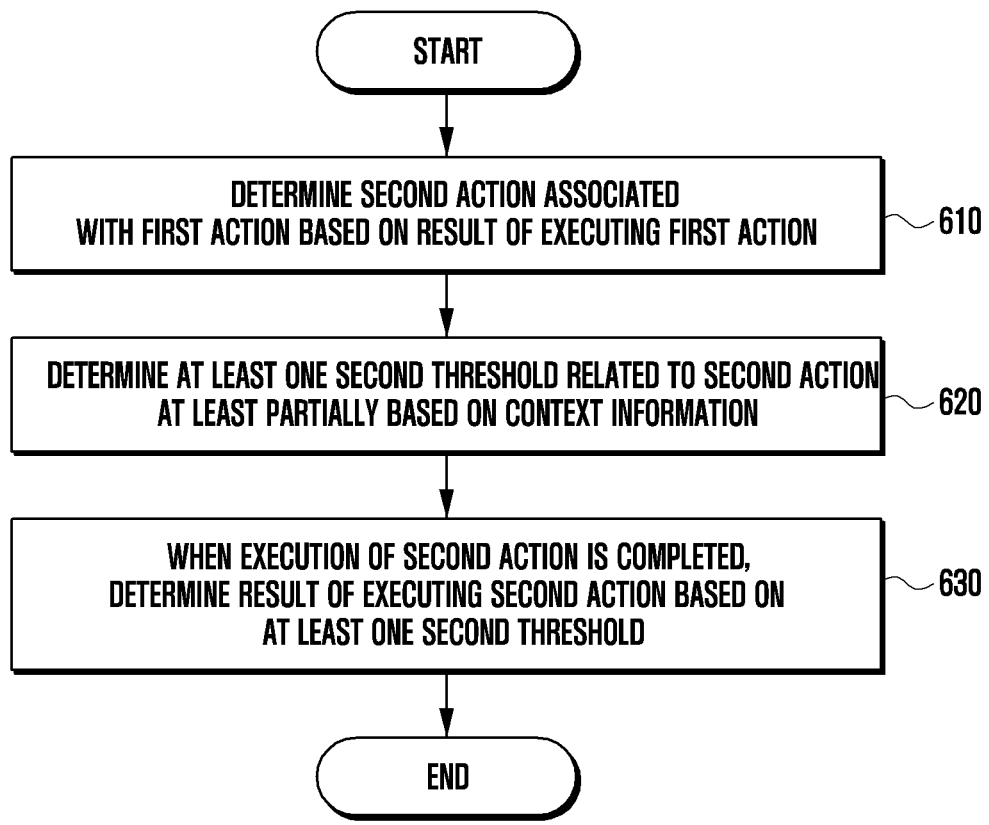
FIG. 6 is a flowchart illustrating an example method for determining actions to be executed in sequence according to various embodiments.

FIG. 6 is a flowchart illustrating an example method for determining actions to be executed in sequence according to various embodiments. Operations of FIG. 6 may, for example, be performed after operation 360 of FIG. 3.

With reference to FIG. 6, in various embodiments, at operation 610, the processor 120 of the electronic device 101 may determine a second action associated with the first action among the plural actions based on the result of executing the first action. For example, when the first action is "finding the baby room", the processor 120 may determine to execute an action "finding the baby" if "success" is returned as the result of the first action, and may determine to execute an action "finding another room" or "notifying task failure" if "failure" is returned.

In various embodiments, at operation 620, the processor 120 of the electronic device 101 may determine at least one second threshold related to the second action at least partially based on the obtained context information. For example, when the first action is "finding the baby room", the processor 120 may obtain, as context information, information about the current brightness of the baby room, the face of the baby, and/or the size of the baby while executing the action "finding the baby room". Upon determining "finding the baby" as the second action, the processor 120 may dynamically change the face matching ratio F1 preset when determining the task according to the context information.

In various embodiments, at operation 610, when the execution of the second action is completed, the processor 120 of the electronic device 101 may determine the result of executing the second action based on the at least one second threshold.

For example, when the second action is "finding the baby", the processor 120 may determine whether the second action is successful based on the face matching ratio F1, which may be dynamically changed according to the context information.

Figure 7:
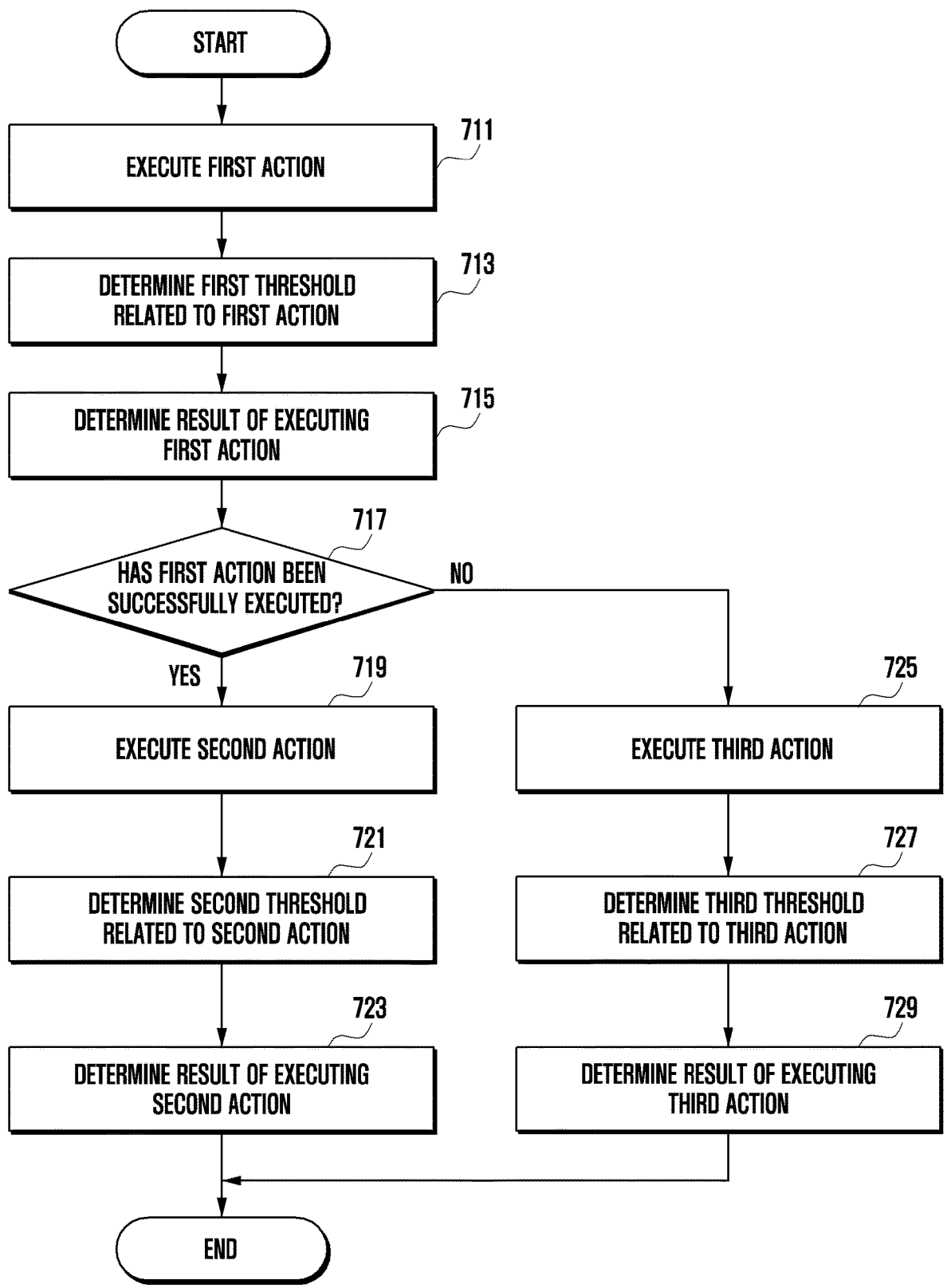
FIG. 7 is a flowchart illustrating an example method for performing a task according to various embodiments.

FIG. 7 is a flowchart illustrating an example method for performing a task according to various embodiments.

With reference to FIG. 7, the processor 120 of the electronic device 101 may determine a task including a plurality of actions. For example, the task may include a first action, a second action, and a third action, and the first action may be associated with the second action and/or the third action.

At operation 711, the processor 120 of the electronic device 101 may execute a first action of the task. In various embodiments, the processor 120 may obtain context information related with at least one of the first action, the second action, or the third action while executing the first action. The context information may include, for example, history information, environmental information, and user information.

At operation 713, the processor 120 of the electronic device 101 may determine a first threshold associated with (e.g., related to) the first action. In various embodiments, the processor 120 may dynamically change the first threshold, which is set in advance when determining the task, according to the obtained context information.

At operation 715, the processor 120 of the electronic device 101 may determine the result of executing the first action. For example, the processor 120 may determine the result of the first action based on the dynamically changed first threshold.

At operation 717, the processor 120 of the electronic device 101 may check (determine) whether the first action has been successfully executed. For example, the processor 120 may determine that execution of the first action is successful if the first threshold is satisfied (e.g., exceeded), and may determine that execution of the first action is unsuccessful if the first threshold is not satisfied (e.g., not exceeded).

Upon determining that execution of the first action is successful ("Yes" at operation 717), at operation 719, the processor 120 of the electronic device 101 may execute the second action. In various embodiments, the processor 120 may obtain context information related with at least one of the second action or another action associated with the second action while executing the second action.

At operation 721, the processor 120 of the electronic device 101 may determine the second threshold related to the second action. In various embodiments, the processor 120 may dynamically change the second threshold set in advance when determining the task according to the context information obtained during execution of the first action and/or the context information obtained during execution of the second action.

At operation 723, the processor 120 of the electronic device 101 may determine the result of executing the second action. For example, the processor 120 may determine the result of the second action based on the dynamically changed second threshold.

Upon determining that execution of the first action is unsuccessful ("No" at operation 717), at operation 725, the processor 120 of the electronic device 101 may execute the third action. In various embodiments, the processor 120 may obtain context information related with at least one of the third action or another action associated with the third action while executing the third action.

At operation 727, the processor 120 of the electronic device 101 may determine the third threshold related to the third action. In various embodiments, the processor 120 may dynamically change the third threshold set in advance when determining the task according to the context information obtained during execution of the first action and/or the context information obtained during execution of the third action.

At operation 729, the processor 120 of the electronic device 101 may determine the result of executing the third action. For example, the processor 120 may determine the result of the third action based on the dynamically changed third threshold.

Figure 8A:
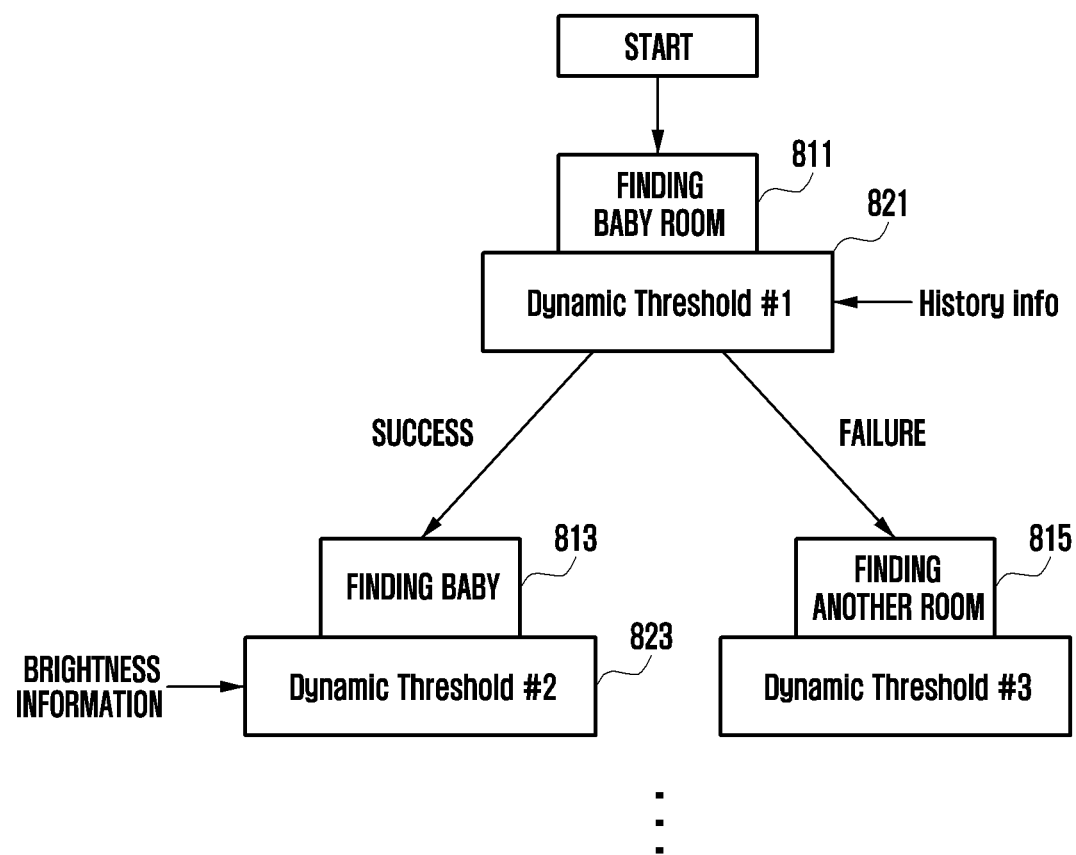
FIG. 8A is a diagram illustrating an example process of performing a task according to an embodiment.

FIG. 8A is a diagram illustrating an example process of performing a task according to an embodiment.

FIG. 8A depicts a task determined when the user says "REDI, go to the baby room and let me know when the baby wakes up!" After checking the user input, the processor 120 may determine a task including various actions such as "finding the baby room", "finding the baby", "finding another room", "monitoring the baby", and "notifying the user when the baby wakes up".

In various embodiments, the processor 120 may execute the action "finding baby room" (811) as the first action. The processor 120 may recognize that either the action "finding baby" (813) or the action "finding another room" (815) may be executed according to the result of the action "finding baby room" (811). The processor 120 may obtain context information related to the actions "finding baby room" (811), "finding baby" (813), and/or "finding another room" (815), such as history information related to the baby room, information about the brightness of the baby room, and/or information about the face of the baby and the size of the baby.

In various embodiments, the processor 120 may dynamically change dynamic threshold #1 (821) assigned to the action "finding baby room". For example, when dynamic threshold #1 (821) is given by the time T1 required to find the baby room (e.g., 30 seconds), the processor 120 may obtain history information while executing the action "finding baby room" and may check whether there is pre-stored information about the baby room in the history information. If the baby room has never been visited, the processor 120 may increase the value of the time T1 (e.g., 60 seconds). If there is some information about the baby room, the processor 120 may decrease the value of the time T1 (e.g., 20 seconds) or maintain the current value thereof (e.g., 30 seconds).

In various embodiments, the processor 120 may determine the result of executing the action "finding baby room" (811) based on dynamically changed dynamic threshold #1 (821), and may determine an action to be executed next based on the execution result. For example, the processor 120 may determine to execute the action "finding baby" (813) if "success" is returned as the result of "finding baby room" (811), and may determine to execute the action "finding another room" (815) if "failure" is returned.

In various embodiments, the processor 120 may dynamically change dynamic threshold #2 (823) assigned to the action "finding baby" (813). Dynamic threshold #2 (823) may include, for example, a time T2 required to find the baby, and a face matching ratio F1. In an example embodiment, the processor 120 may obtain, as context information, before or during the execution of the action "finding baby" (813), information about the size of the baby (e.g., the length of the baby when lying down), the size of the baby's face, and the location where the baby previously slept. The context information thus obtained can be used to dynamically change dynamic threshold #2.

In an example embodiment, the processor 120 may dynamically change the face matching ratio F1 (e.g., 70%) based on information about the current brightness of the baby room. The processor 120 may set the face matching ratio F1 to different values depending upon whether the baby room is bright or dark. For example, when the baby room is dark, the face matching ratio F1 can be reduced to 50% because it is difficult to recognize the baby's face. In this case, if an object with a face matching ratio of 60% is found as a result of the action "finding the baby", the processor 120 may return "failure" in a bright environment, and may return "success" in a dark environment.

Figure 8B:
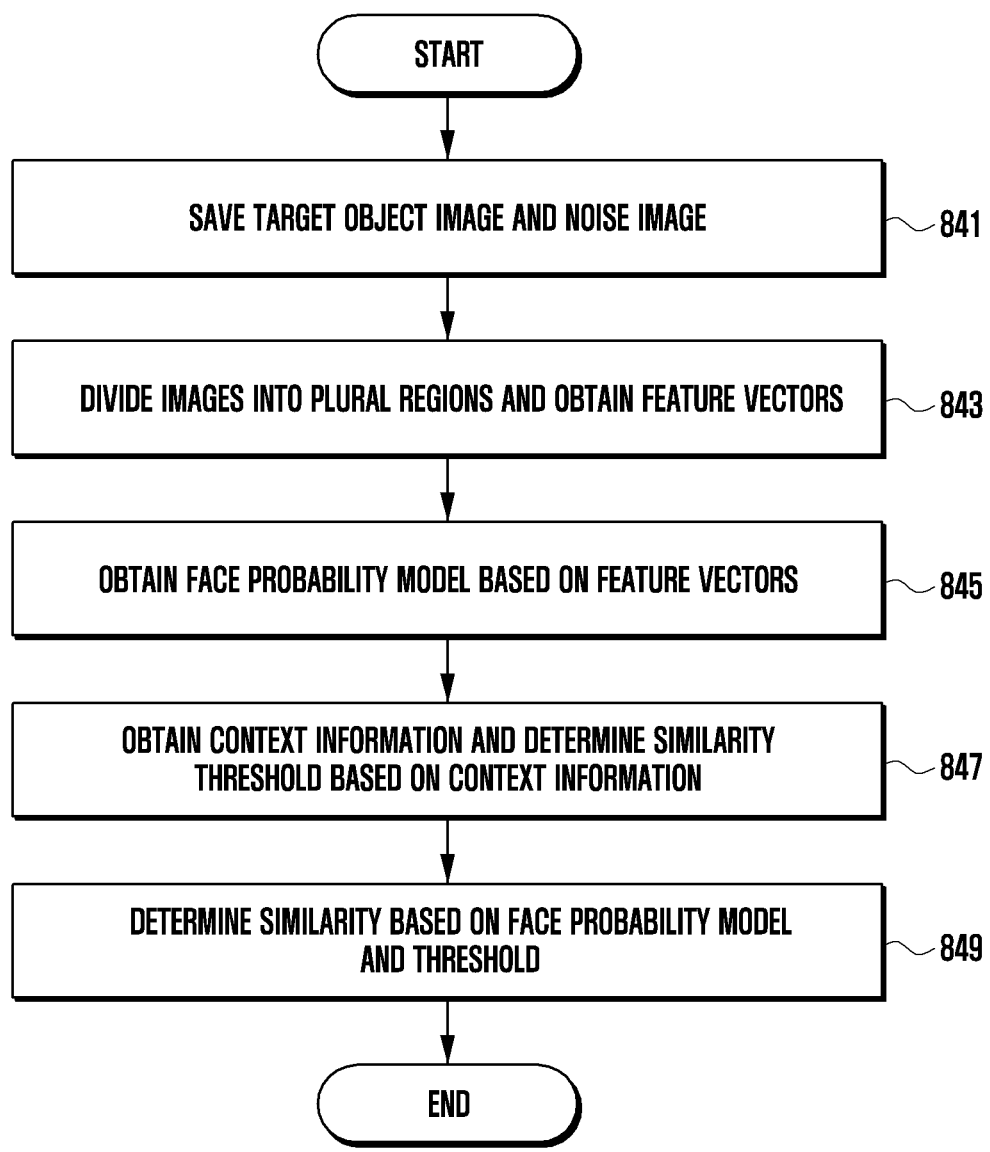
FIG. 8B is a flowchart illustrating an example method for identifying a target object according to an embodiment.

FIG. 8B is a flowchart illustrating an example method for identifying a target object according to an embodiment.

With reference to FIG. 8B, in various embodiments, at operation 841, for face recognition, the processor 120 of the electronic device 101 may store at least one reference image including a target object and at least one noise image, which is a version of the reference image including noise.

In various embodiments, at operation 843, the processor 120 of the electronic device 101 may divide the reference image and the noise image into plural regions and obtain a feature vector for each region. For example, the processor 120 may utilize principal component analysis (PCA) or linear discriminant analysis (LDA) to obtain a feature vector.

In various embodiments, at operation 845, the processor 120 of the electronic device 101 may obtain a face probability model for the target object based on the feature vectors.

In various embodiments, at operation 847, the processor 120 of the electronic device 101 may obtain context information such as brightness information, size information of the target object, or face size information of the target object, and may dynamically change at least one threshold based on the obtained context information. For example, in a dark environment, the processor 120 may set the threshold associated with face recognition to a value less than the preset value.

In various embodiments, at operation 849, the processor 120 of the electronic device 101 may determine the similarity between the recognized object and the target object based on the face probability model and the dynamically changed threshold. For example, the face probability model of the target object may be compared with the image information of the object captured by the camera to determine whether the object is similar to the target object.

Figure 9:
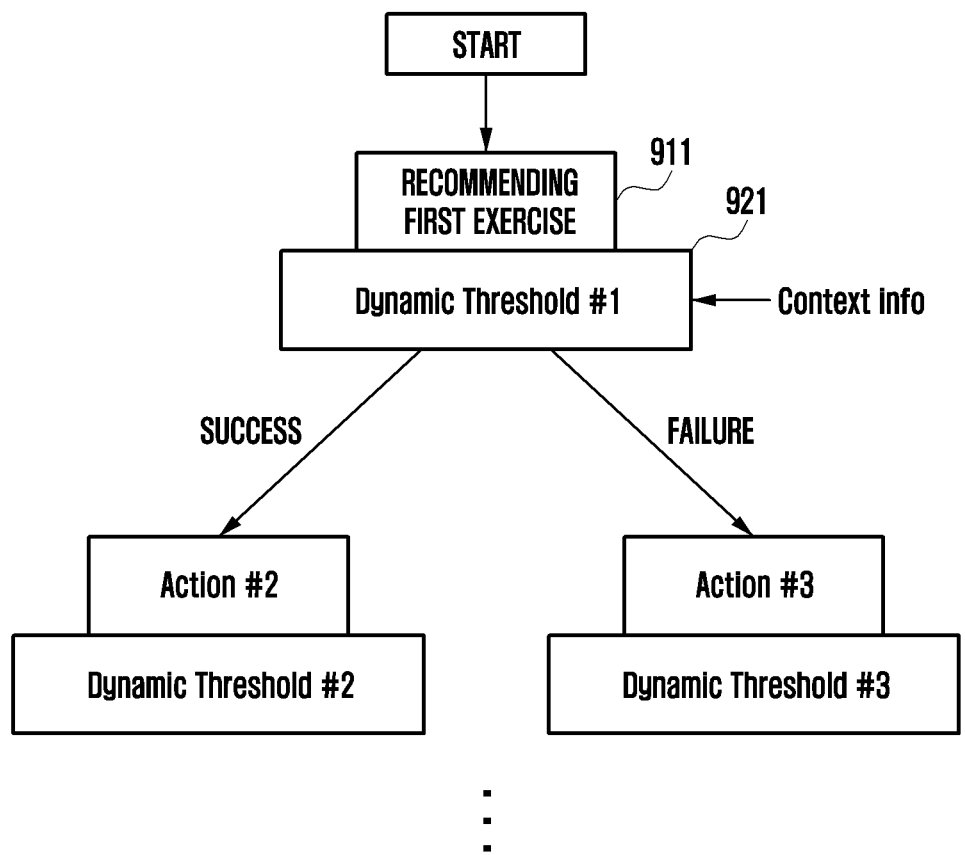
FIG. 9 is a diagram illustrating an example process of performing a task according to an embodiment.

FIG. 9 is a diagram illustrating an example process of performing a task according to an embodiment.

FIG. 9 depicts a task of recommending an exercise to the user. For example, in response to a user input or a designated event, the processor 120 may determine a task of recommending an exercise and recommend the exercise according to the determined task.

In various embodiments, the processor 120 may determine the first exercise to be recommended first based on the context information. For example, when the user exercises for the first time using the electronic device 101, the processor 120 may check the user's body information (e.g., height, body type, expected age, and gender) using a camera, and may determine a first exercise accordingly. If there is no information about the user, the processor 120 may dynamically change the threshold related with user identification, such as a face recognition ratio or an object recognition ratio. For example, the face recognition rate and/or the object recognition ratio may be set to a value greater than the default value, so that accurate user information can be obtained. In a certain embodiment, the processor 120 may use the history information of the user to determine a first exercise suitable for the user. For example, if information about the user is already stored, the processor 120 may determine the exercise that the user enjoys as the first exercise.

In various embodiments, the processor 120 may execute the first action "recommending first exercise" (911). Thereafter, the processor 120 may determine whether the user performs the first exercise and obtain context information related to at least some of the performance of the task. The context information may be related to the user performing the first exercise. For example, the processor 120 may obtain context information such as feedback of the user at the end of the exercise, facial expression of the user, abandonment information, and contents type of the first exercise.

In various embodiments, the processor 120 may change dynamic threshold #1 (921) based on the obtained context information. In an example embodiment, dynamic threshold #1 (921) may be associated with the time interval for exercise feedback. For example, the processor 120 may be configured in advance to give exercise feedback (e.g., "You're doing well") after a specified period of time (e.g., 60 seconds). The processor 120 may obtain information on the expression or sound of the user performing the first exercise as context information and may change the time interval for exercise feedback according to the context information. For example, the time interval for exercise feedback may be changed to give more frequent feedback (e.g., 40 seconds) when the user's facial expression or gesture indicates "tiredness" or "difficulty" compared with when the user's facial expression or gesture indicates "excitement" or "fun".

In an example embodiment, dynamic threshold #1 (921) may be associated with the contents of exercise feedback. For example, the processor 120 may be configured in advance to give exercise feedback (e.g., "repeat three times") when the user performs the exercise a specified number of times (e.g., ten times). The processor 120 may obtain information on the expression or gesture of the user performing the first exercise as context information and may change the contents of exercise feedback according to the context information. For example, the processor 120 may provide exercise feedback "one more time" or "go to the next move" according to the context information.

Figure 10:
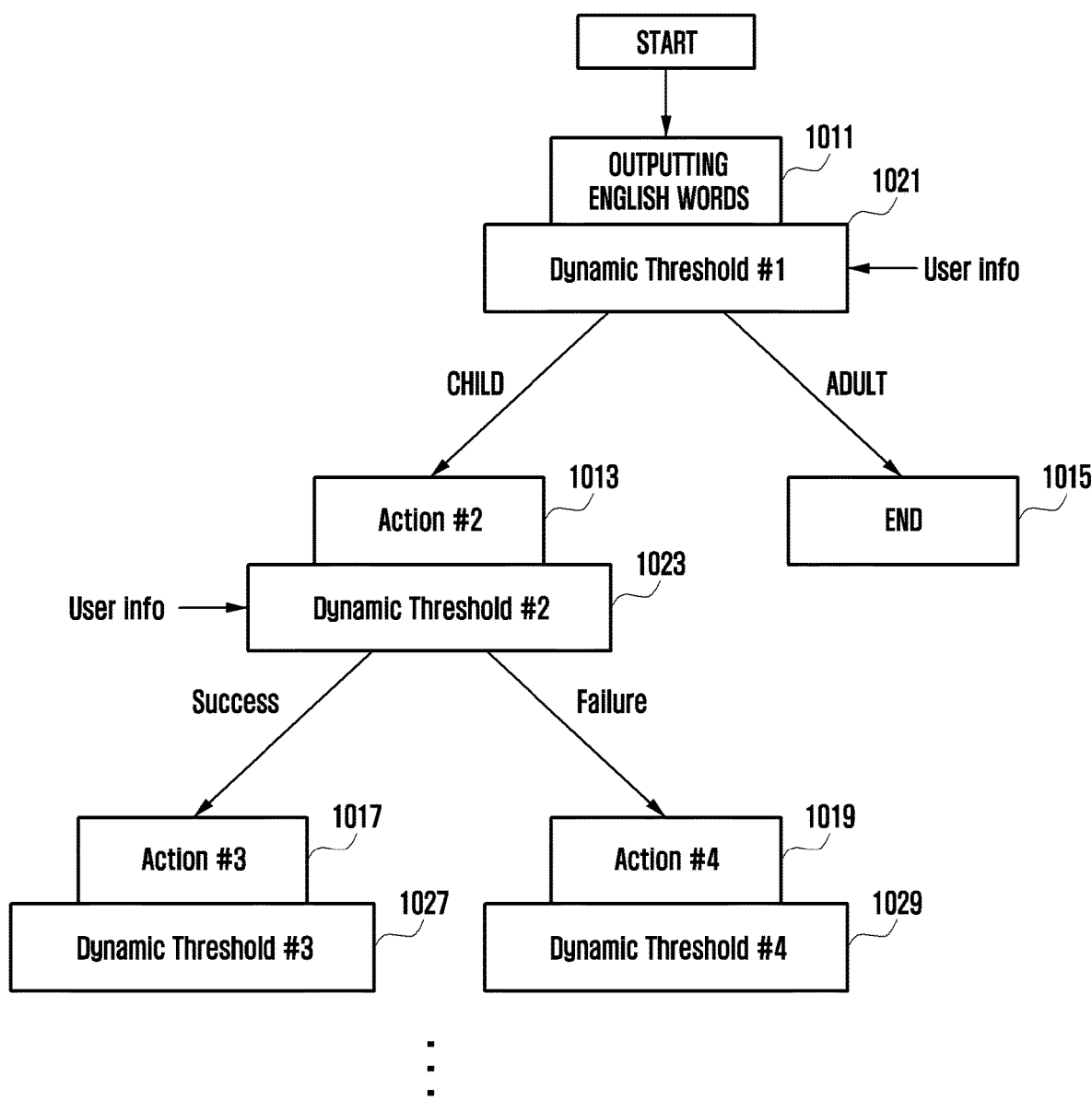
FIG. 10 is a diagram illustrating an example process of performing a task according to an embodiment.

FIG. 10 is a diagram illustrating an example process of performing a task according to an embodiment.

FIG. 10 depicts a case where "REDI, what is a butterfly in English" is received as a user input. The processor 120 may determine "outputting English words" (1011) as the first action based on the user input. For example, the processor 120 may provide a word "butterfly" to the user through the speaker and/or the display.

In various embodiments, the processor 120 may obtain context information. For example, the processor 120 may obtain user information to determine whether the user is an adult or a child. For example, the processor 120 may determine whether the user is an adult or a child by checking whether the user can read or pronounce "butterfly".

In various embodiments, the processor 120 may perform Action #2 (1013) if the user is determined to be a child, and may perform the end action 1015 if the user is determined to be an adult. Action #2 (1013) may include the feedback "Could you repeat it?". In an example embodiment, Action #2 (1013) may have dynamic threshold #2 (1023). The processor 120 may determine whether action #2 (1013) is successfully executed based on dynamic threshold #2 (1023). For example, the processor may perform Action #3 (1017) if "success" is returned as the result of Action #2 (1013), and may perform Action #4 (1019) if "failure" is returned as the result of Action #2 (1013). In an example embodiment, Action #3 (1017) may have dynamic threshold #3 (1027), and Action #4 (1019) may have dynamic threshold #4 (1029).

The electronic device according to various example embodiments disclosed herein can be any of various types of devices, such as, for example, and without limitation, portable communication devices (e.g., smartphones), computers, portable multimedia devices, portable medical instruments, cameras, wearable devices, home appliances, or the like. However, the electronic device is not limited to the above-mentioned devices.

It should be understood that the various embodiments of the present disclosure and the terminology used are not intended to limit the techniques described herein to specific embodiments but to include various modifications, equivalents, and/or alternatives thereof. In the drawings, the same or similar reference symbols may be used to refer to the same or like parts.

In the disclosure, the singular forms "a", "an" and "the" are intended to include the plural forms as well, unless the context clearly indicates otherwise.

In the disclosure, the expression "A or B", "at least one of A and/or B", "A, B or C", or "at least one of A, B and/or C" may indicate all possible combinations of the listed items.

The terms "first" and "second" may refer to various elements regardless of importance and/or order and are used to distinguish one element from another element without limitation. It will be understood that when an element (e.g., first element) is referred to as being (operatively or communicatively) "coupled with/to" or "connected with/to" another element (e.g., second element), it can be coupled or connected with/to the other element directly (wiredly), wirelessly, or via a third element.

In the description, the term "module" may refer to a certain unit that is implemented in hardware, software, firmware, or a combination thereof. The term "module" may be used interchangeably with the term "unit", "logic", "logical block", "component", or "circuit", for example. The module may be the minimum unit of a single-bodied component or a part thereof. The module may be the minimum unit, or a part thereof, which performs one or more particular functions. For example, a module may be implemented in the form of an application-specific integrated circuit (ASIC).

Various embodiments of the present document may be implemented in software (e.g., programs 140) including instructions stored in a machine-readable storage medium (e.g., internal memory 136 or external memory 138) readable by a machine (e.g., electronic device 101). The processor (e.g., processor 120) of the machine can fetch a stored instruction from a storage medium and execute the fetched instruction. This enables the machine to perform at least one function in accordance with the fetched instruction. The instructions may include a code generated by a compiler and a code executable by an interpreter. The machine-readable storage medium may be provided in the form of a non-transitory storage medium. The "non-transitory" storage medium may not include a signal (e.g., electromagnetic wave) and is tangible, but does not distinguish whether data is stored semi-permanently or temporarily in the storage medium.

The method according to various embodiments disclosed herein may be provided as a computer program product. A computer program product may be traded between a seller and a purchaser as a commodity. A computer program product may be distributed in the form of a machine-readable storage medium (e.g., compact disc read only memory (CD-ROM)) or be distributed online (e.g., download or upload) directly between two user devices (e.g. smartphones) through an application store (e.g., PlayStore™). For on-line distribution, at least a portion of the computer program product may be temporarily stored or temporarily created in a storage medium such as a memory of a manufacturer's server, an application store's server, or a relay server.

Each of the components (e.g., modules or programs) according to various embodiments described above may include one or more elements. An existing component may be omitted, and a new component may be added. Alternatively or additionally, some of the components may be combined into one entity while maintaining the same functionality. Operations supported by a module, program, or another component may be carried out in sequence, in parallel, by repetition, or heuristically. Some operations may be executed in a different order or may be omitted, and a new operation may be added.

While various example embodiments have been illustrated and described, it will be understood that the example embodiments are intended to be illustrative, not limiting. Various changes in form and details may be made without departing from the true spirit and full scope of the disclosure including the appended claims and their equivalents.

What is claimed is:

1. An electronic device comprising:
   a user interface;
   a processor operatively connected to the user interface; and
   a memory operatively connected to the processor,
   wherein the memory is configured to store instructions that, when executed, cause the processor to control the electronic device to:
   receive an input via the user interface;
   determine a task including plural actions based on the input, each action of the plural actions having an associated pre-set threshold used for determining whether the each action has been successfully completed;
   execute a first action among the plural actions;
   obtain first context information related to the task at a first time point while executing the first action;
   modify a first threshold associated with the first action, based at least in part on the first context information;
   determine a result of the first action based on the modified first threshold, after the execution of the first action is completed; and
   select a second action associated with the first action among the plural actions based on the result of the first action, wherein a second threshold associated with the second action is changed from its pre-set threshold based on at least in part on the first context information.

2. The electronic device of claim 1, wherein the instructions, when executed, cause the processor to control the electronic device to determine a result of the second action based on execution of the second action being completed based on the second threshold.

3. The electronic device of claim 1, wherein the first context information comprises at least one of history information stored in the memory or an external electronic device, environmental information obtained using a sensor of the electronic device, or user information.

4. The electronic device of claim 1, wherein the user interface includes at least one of a microphone or a camera, and wherein the input includes at least one of an utterance or an image of a user.

5. The electronic device of claim 4, wherein the utterance includes at least a command to invoke the electronic device.

6. The electronic device of claim 4, wherein the image of the user includes at least one of a gesture or a motion for invoking the electronic device.

7. The electronic device of claim 4, wherein the instructions, when executed, cause the processor to control the electronic device to identify a state of the user based on the image of the user.

8. The electronic device of claim 1, wherein the instructions, when executed, cause the processor to control the electronic device to:
   identify location information of the electronic device before determining the task; and
   determine the task based at least in part on the identified location information.

9. A method for determining a task including plural actions, the method comprising:
   receiving an input via a user interface;
   determining a task including plural actions based on the input, each action of the plural actions having an associated pre-set threshold used for determining whether the each action has been successfully completed;
   executing a first action among the plural actions;
   obtaining first context information related to the task at a first time point while executing the first action;
   modify first threshold associated with the first action, based at least in part on the first context information;
   determining a result of the first action based on the modified first threshold, after the execution of the first action is completed; and selecting a second action associated with the first action among the plural actions based on the result of the first action, wherein a second threshold associated with the second action is changed from its pre-set threshold based on at least in part on the first context information.

10. The method of claim 9, further comprising determining a result of the second action based on execution of the second action being completed based on the second threshold.

11. The method of claim 9, wherein the first context information comprises at least one of history information, environmental information, or user information.

12. The method of claim 9, wherein the user interface includes at least one of a microphone or a camera, and wherein the input includes at least one of an utterance or an image of a user.

13. The method of claim 12, wherein the utterance includes at least a command to invoke an electronic device.

14. The method of claim 12, wherein the image of the user includes at least one of a gesture or a motion for invoking an electronic device.

15. The method of claim 12, further comprising identifying a state of the user based on the image of the user.

16. The method of claim 9, wherein determining a task comprises:
 identifying location information of an electronic device before determining the task; and
 determining the task based at least in part on the identified location information.

* * * * *